Feb. 27, 1951     B. COWART     2,543,153
FLORAL SPRAY BAR
Filed Oct. 11, 1949     2 Sheets-Sheet 1
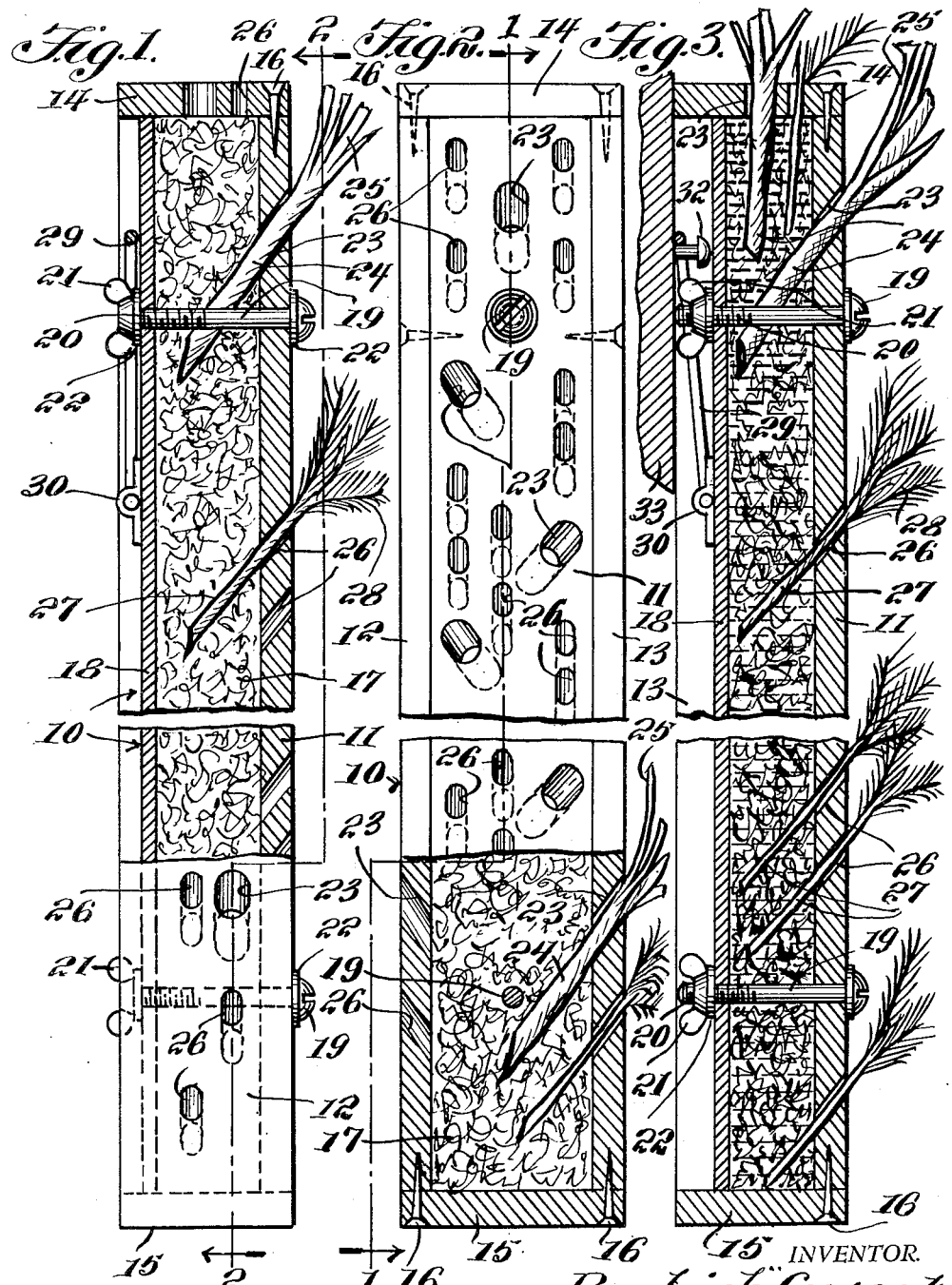
INVENTOR.
Burleigh Cowart,
BY Victor J. Evans & Co.
ATTORNEYS

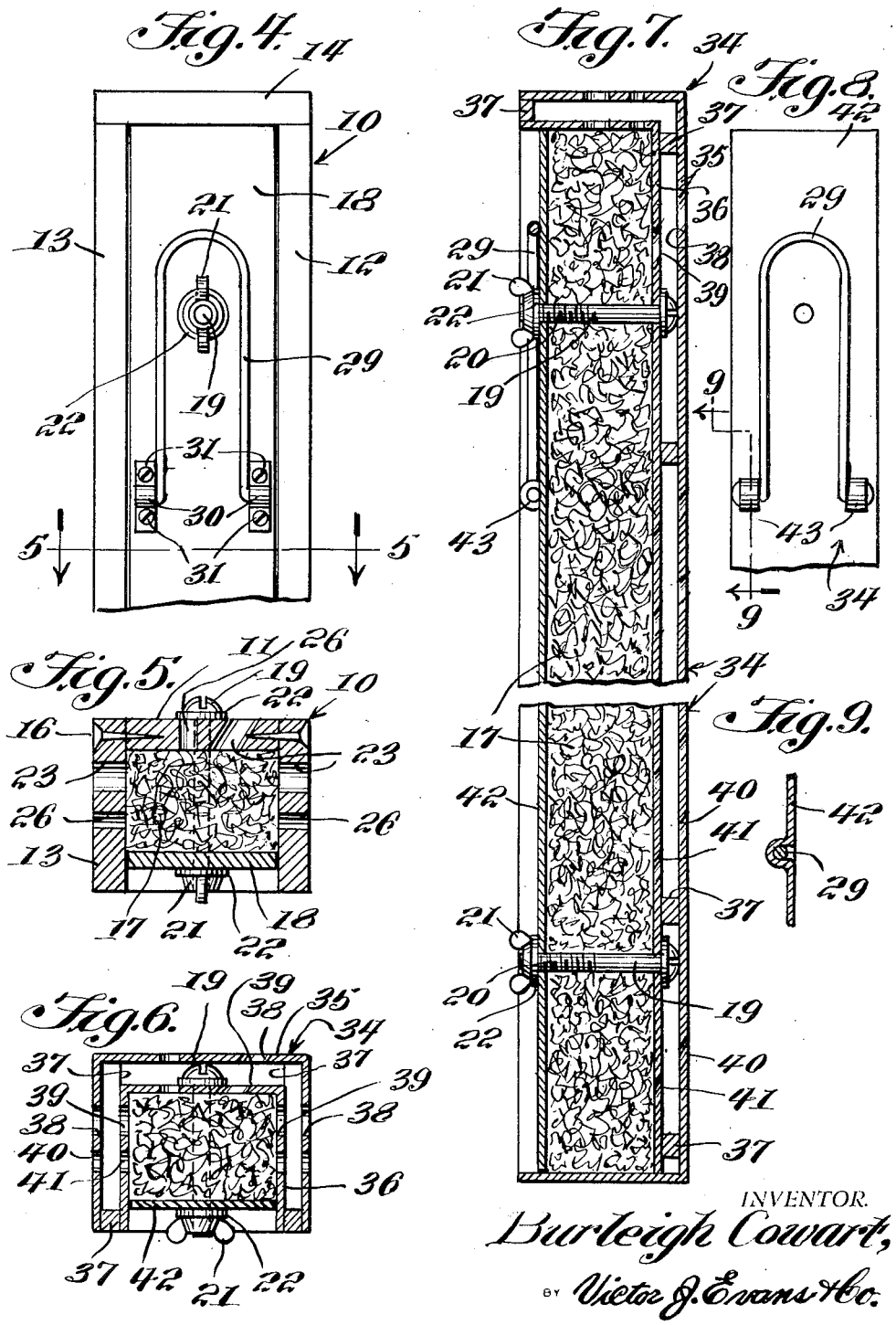

Patented Feb. 27, 1951

2,543,153

UNITED STATES PATENT OFFICE 2,543,153

FLORAL SPRAY BAR

Burleigh Cowart, Pascagoula, Miss.

Application October 11, 1949, Serial No. 120,669

3 Claims. (Cl. 47—41)

This invention relates to a flower holder, and more particularly to a flower holder for use in making a hanging funeral spray bar.

The object of the invention is to provide a holder which will conveniently support a plurality of cut flowers, whereby the flowers will be attractively supported in a vertical position near a casket.

Another object of the invention is to provide a flower holder which contains a moisture absorbent, such as peat moss, the holder being provided with a plurality of openings whereby the flowers can be stuck through these openings and projected into the peat moss, so that water will be supplied to the flowers to sustain the life of the flowers.

Still another object of the invention is to provide a flower holder which contains moisture-holding peat moss, the holder including openings whereby the flowers can be inserted into the peat moss, the holder further including a back wall or plate which can be adjusted so as to securely hold flowers in the holder.

A further object of the invention is to provide a flower holder which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the flower holder, with parts broken away and in section, according to the present invention;

Figure 2 is a sectional view taken on the line 2—2 of Figure 1;

Figure 3 is a fragmentary longitudinal sectional view showing the back wall being used for compressing the peat moss, and showing the flower holder suspended from a supporting body;

Figure 4 is a fragmentary rear elevational view showing the hanger strap;

Figure 5 is a sectional view taken on the line 5—5 of Figure 4;

Figure 6 is a transverse sectional view of a modified flower holder;

Figure 7 is a longitudinal sectional view of the holder of Figure 6;

Figure 8 is a fragmentary rear elevational view of a modified hanger strap;

Figure 9 is a sectional view taken on the line 9—9 of Figure 8.

Referring in detail to Figures 1 through 5 of the drawings, numeral 10 designates a housing which may be fabricated of any suitable material, such as wood. The housing 10 includes a front wall 11 and a pair of spaced parallel side walls 12 and 13 which are secured to the front wall 11. Extending between the side walls 12 and 13 and secured thereto by suitable securing elements, such as nails 16, is a pair of spaced parallel end walls 14 and 15.

Arranged in the housing 10 is a mass of suitable absorbent material, such as peat moss 17. The housing 10 containing the peat moss or other aborbent therein is adapted to be immersed in water just prior to positioning the flowers in the holder, whereby sufficient water will be supplied to the flowers to sustain the life of the cut flowers.

A back wall or plate 18 is adjustably connected to the housing 10, whereby the pressure on the absorbent peat moss 17 can be varied as desired. For adjustably connecting the back wall 18 to the front wall 11 of the housing, a plurality of headed bolts 19 extend between the front wall 11 and the back wall 11. Each of the bolts 19 is provided with an exteriorly-threaded end portion 20 and a wing nut 21 is arranged in threaded engagement with each of the portions 20 for maintaining the parts in assembled relation. Suitable washers 22 are circumposed on the bolts 19, Figures 1 and 3.

Each of the front walls 11, end walls 14 and 15, and side walls 12 and 13 is provided with a plurality of spaced, inclined openings 23. The openings 23 are adapted to receive therein the stems 24 of cut flowers 25. Further, each of the end walls 14 and 15, the side walls 12 and 13 and the front wall 11 is provided with a plurality of inclined openings 26 which are of a smaller diameter than the openings 23. The openings 26 are adapted to receive therein the stems 27 of smaller flowers 28, or, if desired, ferns may be projected or inserted through the openings 26 and into the peat moss 17.

Pivotally connected to the back wall 18, and arranged adjacent the upper end thereof, is a hanger strap 29. The hanger strap 29 has each of its ends pivotally connected to the back wall 18 by a bracket 30, Figure 4, and each of the brackets 30 is connected to the back wall 18 by suitable securing elements, such as screws 31. When the spray bar is being used, the web of the hanger strap 29 can be arranged in engagement with a securing element 32 which may be driven into a wall or other supporting structure 33, Figure 3, whereby the spray bar of the present invention will be suspended in a vertical position.

Referring in detail to Figures 6 and 7, there is shown a modified flower holder, which is indicated generally by the numeral 34. The holder 34 includes an inner container 36 and an outer container 35 which is arranged in spaced relation about the inner container 36. A plurality of spacer blocks 37 are interposed between the inner and outer containers.

The outer container 35 is provided with a plurality of spaced, inclined openings 38, and the openings 38 are adapted to register with inclined openings 39 in the inner container 36. The openings 38 and 39 serve to receive therein the stems of flowers, and the inner ends of the flowers engage the moisture-containing peat moss 17 which is arranged in the inner container 36. Further, the outer container 35 is provided with a plurality of spaced openings 40 which are of a smaller diameter than the openings 38, and the openings 40 register with openings 41 in the inner container 36, the openings 40 and 41 serving to support smaller flowers or ferns, as desired. A back wall or plate 42 is adjustably connected to the inner container 36 by suitable securing elements, such as the bolts 19 which have the wing nuts 21 connected thereto, whereby the pressure on the peat moss 17 can be varied as desired.

In Figures 8 and 9, there is shown a modified method of connecting the hanger strap 29 to the back wall of the flower holder. Thus, a pair of ears 43 are stamped from the back wall 42, and the ears 43 pivotally connect the free ends of the hanger strap 29 to the back wall 42, so that the hanger strap 29 provides a means for supporting the spray bar of the present invention in a vertical position.

From the foregoing, it is apparent that a flower holder has been provided wherein a plurality of cut flowers of various sizes can be positioned through the openings 23 and 26 of the device shown in Figures 1 through 4. The openings 23 and 26 are adapted to receive the stems of the flowers, and the inner ends of the stems project into the mass of peat moss 17, which has been previously soaked in water, so that sufficient water will be supplied to the flowers to sustain their life. The size and spacing of the openings 23 and 26 can be changed or varied as desired, depending upon the flowers being supported and the effect desired. Further, by tightening the wing nuts 21, the plate 18 will move from the position shown in Figure 1 to the position shown in Figure 3, whereby the peat moss 17 will be compressed so that the cut flowers will be securely held in the holder, whereby the flowers will be prevented from accidentally falling from the openings therein.

In the flower holder shown in Figures 6 and 7, the holder is fabricated of any suitable material, such as sheet metal, and the holder comprises a pair of containers 35 and 36 which are provided with registering openings therein. The openings in these containers are adapted to receive stems of cut flowers therein, and these flowers again project into the mass of peat moss 17 which supplies sufficient water to the cut flowers. Further, each of the holders is provided with a hanger strap 29, whereby the spray bar can be conveniently hung in a vertical position.

From the foregoing, it is apparent that a holder has been provided wherein flowers or ornamental decorations can be supported. By using the device of the present invention, the stems or roots of the flowers are arranged in engagement with the water-containing peat moss and, further, by using the holder of the present invention, an inexperienced person will be able to make a professional-looking funeral spray simply by cutting flowers or ferns and putting the flowers and ferns through the inclined holes and then tightening the nuts 21, whereby the peat moss will be packed tightly against the flower stems so as to hold the stems firmly in position. The device of the present invention will improve the art of making routine funeral sprays, since the designer will only have to cut the flowers and stick them into the holes and then tighten the wing nuts. It is to be understood that the spray bar of the present invention is soaked in water a few seconds prior to using the spray bar, so as to wet the peat moss.

What is claimed is:

1. In a flower holder, an inner casing adapted to hold peat moss, a back wall adjustably connected to said inner casing, a hanger strap connected to said back wall, an outer container arranged in spaced relation about said inner casing, there being a plurality of spaced registering openings in each of said casings and container for the projection therethrough of flower stems.

2. A flower holder comprising an inner container for holding peat moss, and an outer container arranged in spaced relation about said inner container, a plurality of spacer blocks interposed between said inner and outer containers, there being a plurality of spaced inclined registering openings in said inner and outer containers for receiving therein stems of flowers, a back wall adjustably connected to said inner container, and a hanger strap pivotally connected to said back wall.

3. In a flower holder, an inner casing adapted to hold a water-absorbent material, a back wall connected to said inner casing, a hanger strap connected to said back wall, an outer container arranged in spaced relation about said inner casing, there being a plurality of spaced registering openings in each of said casings and container for the projection therethrough of flower stems.

BURLEIGH COWART.

REFERENCES CITED

The following references are of record in the file of this patent:

UNITED STATES PATENTS

| Number | Name | Date |
|---|---|---|
| 1,336,249 | Ludwig | Apr. 6, 1920 |
| 1,887,139 | Richardson | Nov. 8, 1932 |